(12) United States Patent
Elliott

(10) Patent No.: US 9,908,287 B2
(45) Date of Patent: Mar. 6, 2018

(54) BUILD PLATFORM THAT PROVIDES MECHANICAL ENGAGEMENT WITH ADDITIVE MANUFACTURING PRINTS

(71) Applicant: UT-Battelle, LLC, Oak Ridge, TN (US)

(72) Inventor: Amelia M. Elliott, Cleveland, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 643 days.

(21) Appl. No.: 14/548,701

(22) Filed: Nov. 20, 2014

(65) Prior Publication Data

US 2016/0144563 A1    May 26, 2016

(51) Int. Cl.
| | |
|---|---|
| *B29C 67/00* | (2017.01) |
| *B23Q 7/03* | (2006.01) |
| *B33Y 10/00* | (2015.01) |
| *B33Y 30/00* | (2015.01) |
| *B29C 64/106* | (2017.01) |
| *B29C 64/20* | (2017.01) |

(52) U.S. Cl.
CPC ............ *B29C 67/0055* (2013.01); *B23Q 7/03* (2013.01); *B29C 64/106* (2017.08); *B29C 64/20* (2017.08); *B33Y 10/00* (2014.12); *B33Y 30/00* (2014.12)

(58) Field of Classification Search
CPC ..... B29C 64/20; B29C 64/106; B29C 64/245; B33Y 30/00
See application file for complete search history.

(56) References Cited

U.S. PATENT DOCUMENTS

| | | |
|---|---|---|
| 8,226,395 B2 | 7/2012 | Pax et al. |
| D716,643 S | 11/2014 | Arbesman et al. |
| 2006/0054039 A1* | 3/2006 | Kritchman ............. B29C 41/02 101/424.1 |
| 2007/0126157 A1 | 6/2007 | Bredt |
| 2008/0170112 A1 | 7/2008 | Hull et al. |
| 2011/0241947 A1 | 10/2011 | Scott et al. |
| 2011/0293771 A1 | 12/2011 | Oberhofer et al. |

FOREIGN PATENT DOCUMENTS

| | | |
|---|---|---|
| EP | 1279480 | 1/2003 |
| WO | 2013140146 | 9/2013 |

* cited by examiner

*Primary Examiner* — Christina Johnson
*Assistant Examiner* — Xue Liu
(74) *Attorney, Agent, or Firm* — Colin L. Cini

(57) ABSTRACT

A build platform and methods of fabricating an article with such a platform in an extrusion-type additive manufacturing machine are provided. A platform body 202 includes features 204 that extend outward from the body 202. The features 204 define protrusive areas 206 and recessive areas 208 that cooperate to mechanically engage the extruded material that forms the initial layers 220 of an article when the article is being fabricated by a nozzle 12 of the additive manufacturing machine 10.

9 Claims, 9 Drawing Sheets

BUILD PLATFORM THAT PROVIDES MECHANICAL ENGAGEMENT WITH ADDITIVE MANUFACTURING PRINTS

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

1. Field of the Invention

The present disclosure relates to additive manufacturing devices and methods and more specifically to build platforms for use in such devices.

2. Description of the Related Art

Additive manufacturing or 3D printing refers to machines and methods for fabricating parts layer by layer in an additive manner instead of in a subtractive manner, which tends to waste raw material, take additional time, and limits the geometry of the design. One method of producing parts by additive manufacturing, known as Fused Deposition Modelling (FDM), is by using a heated nozzle to extrude a thermoplastic material to create each 2D layer of a part on a build platform. The thermoplastic material may be in filament or pelletized form and may be blended with fibers for additional strength and dimensional stability.

A part is fabricated by depositing a base layer of material with a nozzle on the build platform to define the perimeter shape and any internal features of the layer. Each additional layer is deposited on the previous layer to define that section of the part. At the completion of each layer, either the nozzle raises upward or the platform lowers downward an amount approximately equal to the thickness of the next layer. When the additive process is complete, the 3D part is removed from the build platform and finished according to specification requirements. Part removal and machine initialization for the next part is generally accomplished by a human operator, which can limit throughput and increase part cost.

Currently in FDM, the bond between the FDM part and the platform it is built on relies on an adhesive bond, which can be unreliable. During the build, the thermoplastic material cools and shrinks, breaking the bond between the first layer of the print and the build platform. This breaking of bonds in conjunction with the forces from the extrusion nozzle at the top of the part causes delamination of the part during the build, which requires the build to be restarted from the beginning. The failure of FDM builds due to delamination is the major reason for FDM build failure and causes a great amount of wasted machine time and material.

Some extrusion type additive manufacturing machines include a heated build chamber and/or a heated build platform to reduce material shrinkage and the resulting quality defects such as delamination, curling, lifting, warping and bending. While a heated build chamber may be practical for chambers with build envelopes in the range of 24 inch (610 mm) or even 36 inch (914 mm) on a side, build envelopes in the range of 10 feet (3.05 meter) or even 40 feet (12.19 meter) on a side are much more impractical and costly to uniformly heat. Fabricating parts without a heated chamber and without having the above-mentioned quality defects can be a challenge. Furthermore, machines with heated build chambers utilize textured build platforms that are designed to optimize adhesive forces, but these platforms are not reusable and add to the cost and waste of the process.

Moreover, unintentional movement of a partially-completed part may cause further quality defects. In one example, a part may acquire a noticeable step or shift in the exterior surfaces at a certain level, and, in another example, the part may actually tip over while additional material continues to be extruded. Adhesion between the part and the build platform can be marginally improved with: the use of bonding adhesives; the application of double sided, adhesive tape; and the roughening or texturing of build platforms to improve adhesion as described in U.S. Pat. No. 8,226,395.

Big Area Additive Manufacturing (BAAM) systems as described in U.S. patent application Ser. No. 14/143,989 are capable of generating parts weighing up to 500 pounds (226.8 Kg) or even up to 2000 pounds (907 Kg) or more for the automotive, aircraft and tooling industries. For example, the Strati electric car, which was manufactured by Local Motors in collaboration with Cincinnati Incorporated and Oak Ridge National Laboratory at the 2014 International Manufacturing Technology Show in Chicago, USA, weighs nearly 2000 pounds (907 Kg).

Large scale parts such as the Strati electric car often undergo secondary operations such as: CNC machining of exterior surfaces; CNC boring of holes, slots, and other features; coating and plating; as well as other finishing operations. In order to properly fixture the part in the various secondary machines for post processing, it is advantageous to have the part remain on the build platform to maintain the original coordinate system that was used to build the part. Secondary finishing operations can induce significant forces on the part, which can cause the adhesion forces between the part and the build platform to fail, thus compromising the original coordinate system.

What is needed are additive manufacturing build platforms that mechanically engage a part for improved part quality, reduced human intervention and increased throughput.

BRIEF SUMMARY OF THE INVENTION

Disclosed are several examples of a build platform and methods of fabricating an article with such a platform in extrusion-type additive manufacturing machines.

In a first example, a platform body includes features extending outward from the body. The features define protrusive areas and recessive areas that cooperate to mechanically engage the extruded material that forms the initial layers of an article while the article is being fabricated by an additive manufacturing nozzle. Other detailed examples are described and illustrated.

A method for fabricating a part from layers of material extruded by an additive manufacturing machine nozzle includes the steps of: positioning a platform body having features extending outward and defining protrusive areas and recessive areas in a build area that is accessible by the nozzle; extruding one or more initial layers of material with the nozzle across the protrusive areas and recessive areas at a first traverse speed such that at least one of the initial layers at least partially fills the recessive areas and is mechanically engaged by the extending features; extruding additional layers of material with the nozzle on top of the initial layers at a second traverse speed such that the additional layers are thermally bonded to the initial layers and the article of manufacture is engaged with the platform body; and disengaging the article of manufacture from the platform. Additional and alternative steps are also described and illustrated in the accompanying detailed description.

BRIEF DESCRIPTION OF THE SEVERAL VIEWS OF THE DRAWINGS

The apparatuses and methods may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF THE INVENTION

With regard to all such embodiments described and contemplated, it will be appreciated that optional features, including, but not limited to, aesthetically pleasing coloration and surface design, and labeling and brand marking, may be provided in association with the present invention, all without departing from the scope of the invention.

Figure 1:
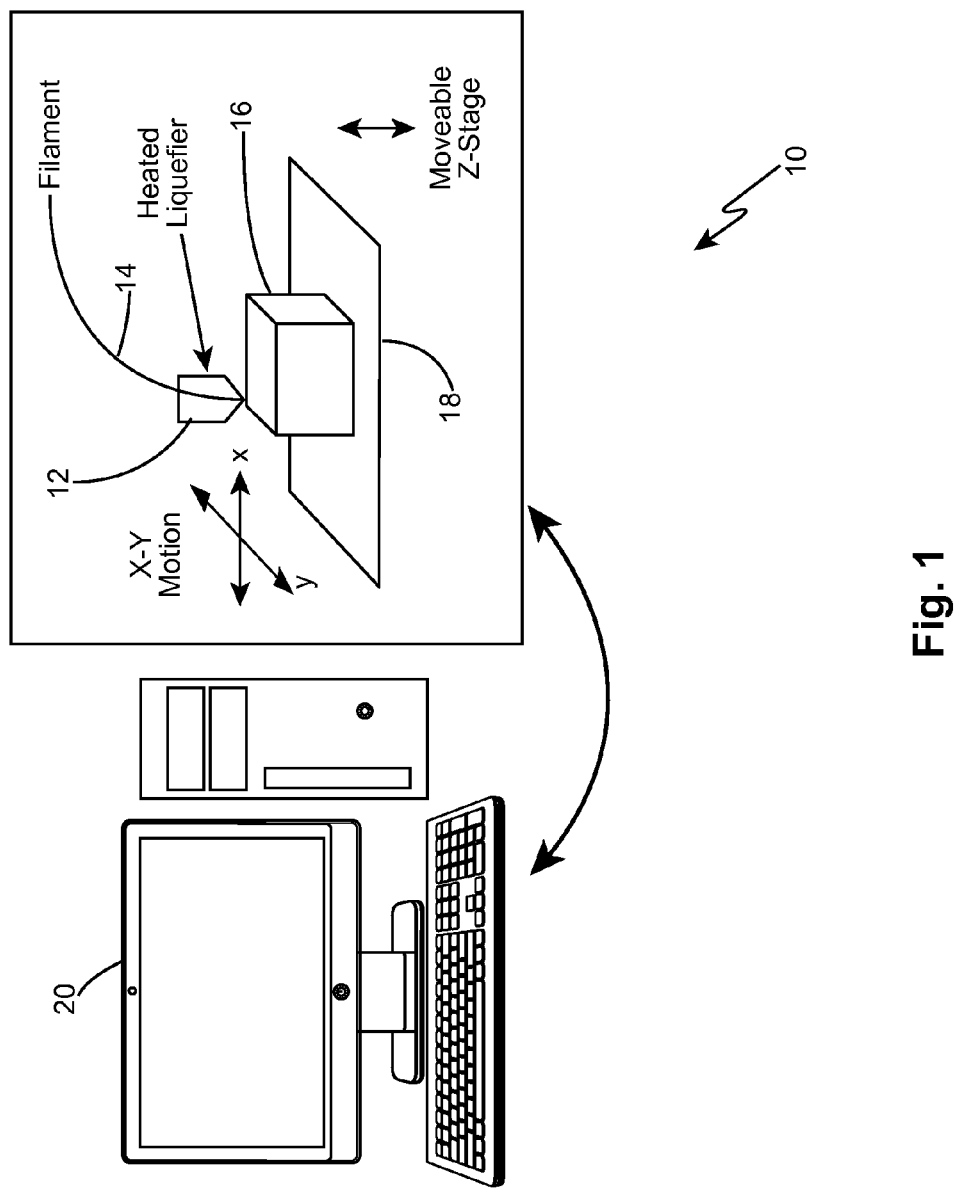
FIG. 1 is a simplified schematic illustration of an extrusion-type additive manufacturing machine with the major components identified.

An extrusion-type additive manufacturing machine, also known as a fused deposition modelling (FDM) machine 10, is schematically depicted in FIG. 1. A nozzle 12 having a central axis traverses in an X-Y plane as it extrudes one or more heated materials 14 to fabricate a layered part 16 on a platform 18. When each layer is complete, the nozzle 12 raises, or the platform 18 lowers in the Z axis and the layering process is repeated until the part 16 is complete. A computer 20 controls the nozzle 12 direction, traverse speed and material 14 flow. FDM machines 10 are typically designated by the maximum X-Y areas and maximum X-Y-Z volumes that are accessible by the nozzle 12 for constructing the largest parts 16 possible.

Figure 2:
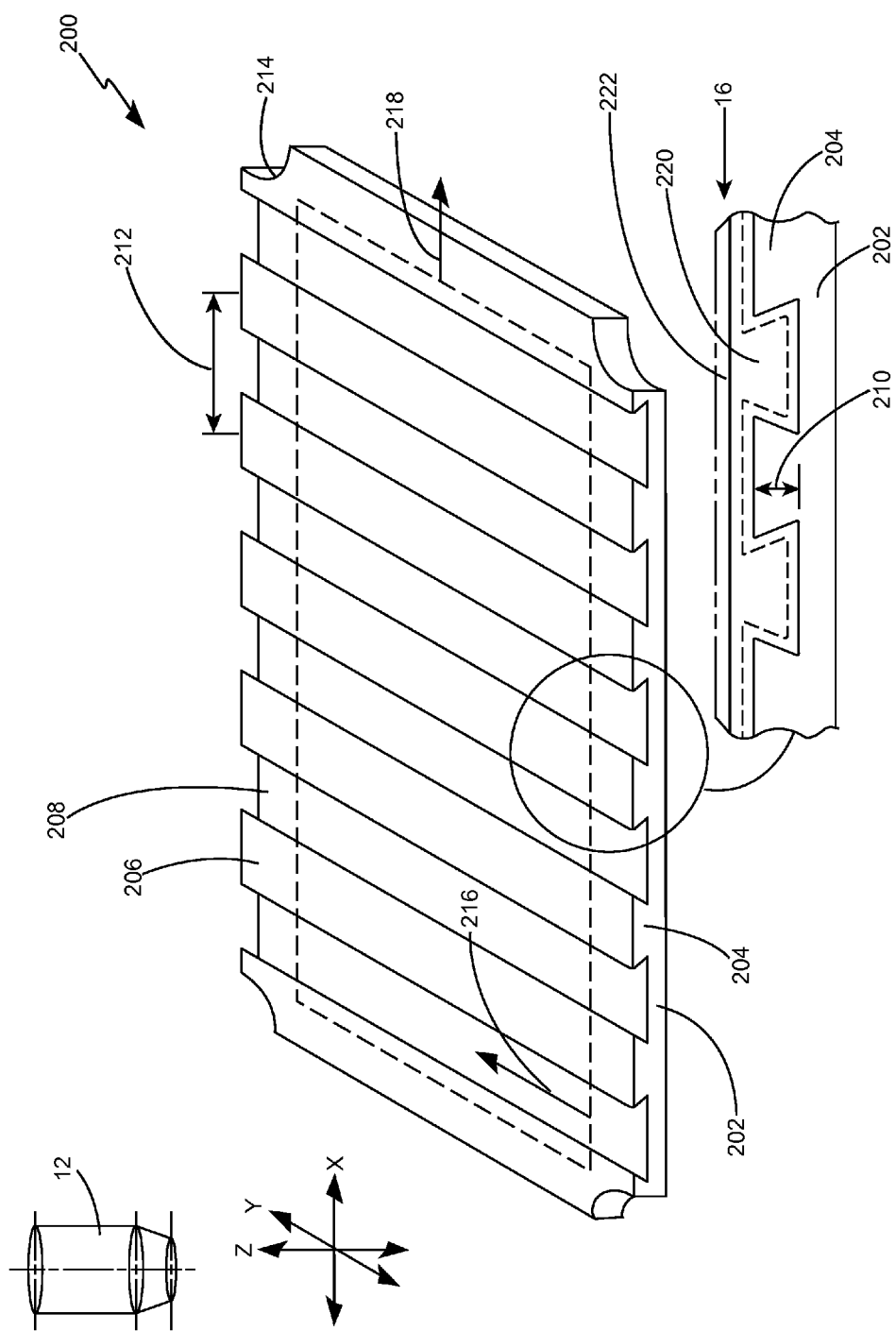
FIG. 2 illustrates an example of a planar build platform with raised features and initial layers of a part shown in phantom lines.

Referring now to FIG. 2, a planar build platform 200 for supporting a part 16 as it is being fabricated in layers by an extrusion-type additive manufacturing machine 10 is shown. A platform body 202 includes a number of raised features 204 that extend outward from the body 202 and along the Z-axis as shown. The features 204 define protrusive areas 206 and recessive areas 208 and extend at a height 210 and spacing 212. Please note that the protrusive areas 206 overhang the recessive areas 208 when viewed from above in the nozzle's central axis direction. A coordinate system or datum registration feature 214 accurately positions the platform 200 in the machine 10 and ensures that the part 16 coordinates can be accurately registered for finishing purposes (e.g., CNC milling machine). A build area 216 that is accessible by a nozzle 12 during a build is defined by a broken line and non-build area 218 that is not accessible by the nozzle 12 during the build extends outside of the build area 216.

In some examples, features 204 have an equal spacing 212 or pitch and in other examples, the features 204 have an unequal spacing 212 or pitch. In the example shown, the cross sectional areas of the features 204 are constant when viewed along the Y axis and in other examples, the cross sectional areas of the features 204 are constant when viewed along the X axis. Other examples and details of the raised features 204 will be discussed in greater detail later.

During the part 16 build, the initial layers 220 of heated material flow between the features 204 and at least partially fill the recessive areas 208 and beneath the overhang of the protrusive areas 206. The initial layers 220 of the part 16 and the raised features 204 cooperate such that, as the material cools, the part 16 is mechanically engaged with the build platform 200. In some instances, it may be beneficial to add a sacrificial foundation comprising 1, 2, 3, or more initial layers 220 to the CAD model to compensate for the material that flows between the features 204.

After additional layers 222 are added and the part 16 is complete, the build platform 200 and engaged part 16 may be removed from the machine 10 and transferred to another machine for post processing (e.g., CNC milling machine, boring machine, coating vat, etc. . . . ). The datum registration features 214 provide positive and accurate placement of the platform 200 so that the coordinates of the part 16 used during the additive manufacturing build are preserved.

To separate a part 16 from the build platform 200, a human operator or mechanical device (e.g., lever arm, solenoid, gripper) may exert enough force on the part 16 to slide it along the direction of the features 204 and off the platform 200. Once the part 16 is removed, the initial layers 220 may be removed by a post processing step such as sanding or surface grinding. In some examples, the platform 200 may be heated to aid in part 16 removal. In other examples, the platform 200 may be flexed or arched to spread the features 204 apart and disengage the part 16. The disengaging function of the platform 200 will be explained in greater detail with respect to the remaining examples.

Figure 3:
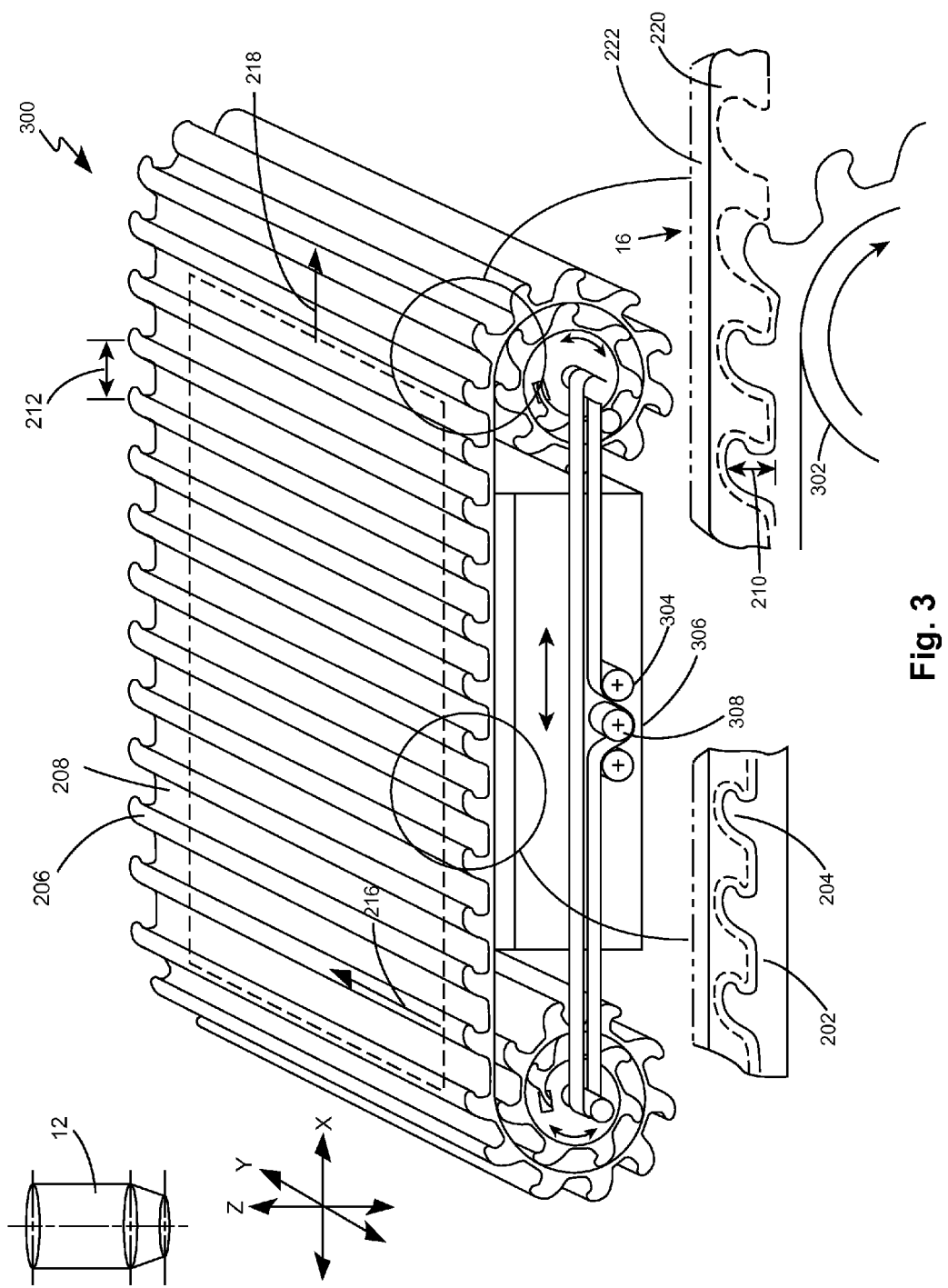
FIG. 3 illustrates an example of a reel-to-reel build platform with raised features and initial layers of a part shown in phantom lines.

Referring now to FIG. 3, a reel-to-reel build platform 300 for supporting a part 16 as it is being fabricated in layers by an extrusion-type additive manufacturing machine 10 is shown. A platform body 202 includes a number of raised features 204 that extend outward from the body 202 along the Z-axis as described above. Here, the platform 300 is a discontinuous belt-like structure that is made from a flexible material and/or a flexible structure.

In this example the non-build area 218 that is not accessible by the nozzle 12 wraps around a roller or wheel 302 that is rotatable about either the X-axis or Y-axis (shown). The roller 302 may have an outer surface that is toothed, made of rubber or urethane or otherwise able to grip the platform 300. The non-build area 218 wraps at least ninety degrees about the roller 302 or, in some examples, it wraps more than ninety degrees around the roller 302. In this example, two rollers 302 are locked in place with a locking device 304 such as a solenoid, pin, latch, brake, gear, belt or other mechanism during the part 16 build to prevent movement. A stage 306 supports the platform 300 beneath the build area 216 to prevent movement in the Z-axis direction.

Once the part 16 is complete, the locking device 304 is released and the roller 302 is advanced manually by a human operator or automatically with a powering device 308. As the platform 300 advances about the roller 302, the finished part 16 moves from the build area 216 to the non-build area 218 and above the roller 302, where the spacing between the features 204 increases and the protrusive areas 206 separate apart. This increased spacing and separation, along with the platform's 300 non-linear path, begins to disengage, or unzip, the first few layers 220 of the part 16 from their mechanical engagement with the platform 300. Further advancement of the platform 300 by the powering device 308 and roller 302 disengages the part 16 completely from the platform 300.

The platform 300 is able to move in each of the X-axis directions (back and forth) as shown or in each of the Y-axis directions (in and out) if the rollers 302 are mounted perpendicular to their orientations shown in the figure. With this capability, the platform 300 and parts 16 can be advanced several times in one direction and then reversed and advanced several times in the other direction. The back and forth or in and out cycles allow multiple parts 16 to be fabricated automatically with little or no intervention by a human operator.

Figure 4:
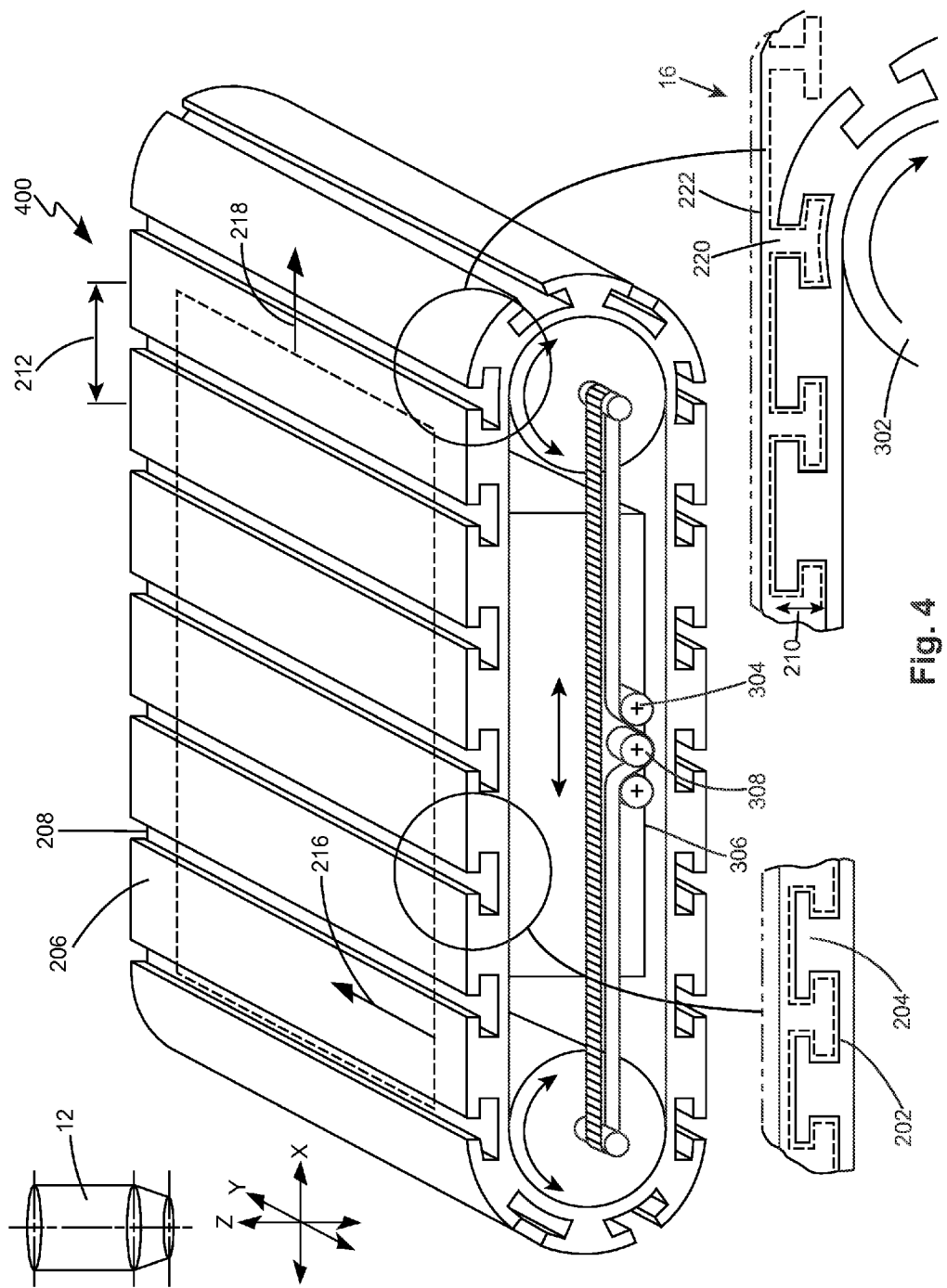
FIG. 4 illustrates an example of a conveyor-belt build platform with raised features and initial layers of a part shown in phantom lines.

Referring now to FIG. 4, a conveyer-belt build platform 400 for supporting a part 16 as it is being fabricated in layers by an extrusion-type additive manufacturing machine 10 is shown. A platform body 202 includes a number of raised features 204 that extend outward from the body 202 along the Z-axis as described above. Here, the platform 400 is a continuous belt-like structure that is made from a flexible material and structure that rotates about rollers 302 in one or two directions.

Figure 5:
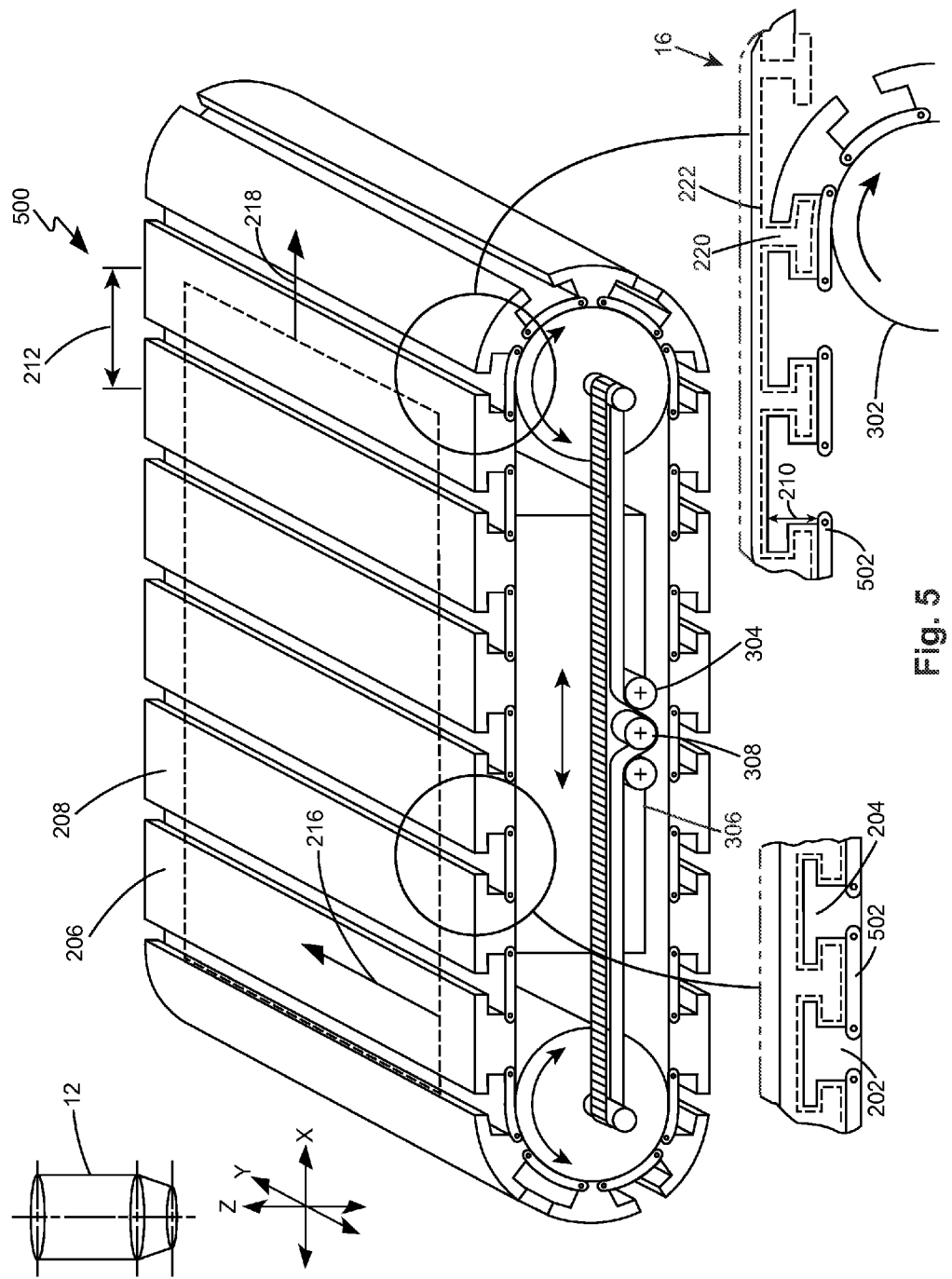
FIG. 5 illustrates an example of a linked-track build platform with raised features and initial layers of a part shown in phantom lines.

Referring now to FIG. 5, a linked-track build platform 500 for supporting a part 16 as it is being fabricated in layers by an extrusion-type additive manufacturing machine 10 is shown. A platform body 202 includes a number of raised features 204 that extend outward from the body 202 along the Z-axis as described above. In this example, the build platform 500 is made of a series of individual links 502, which allows the platform 500 to extend around a roller 302 as described above.

Figure 6:
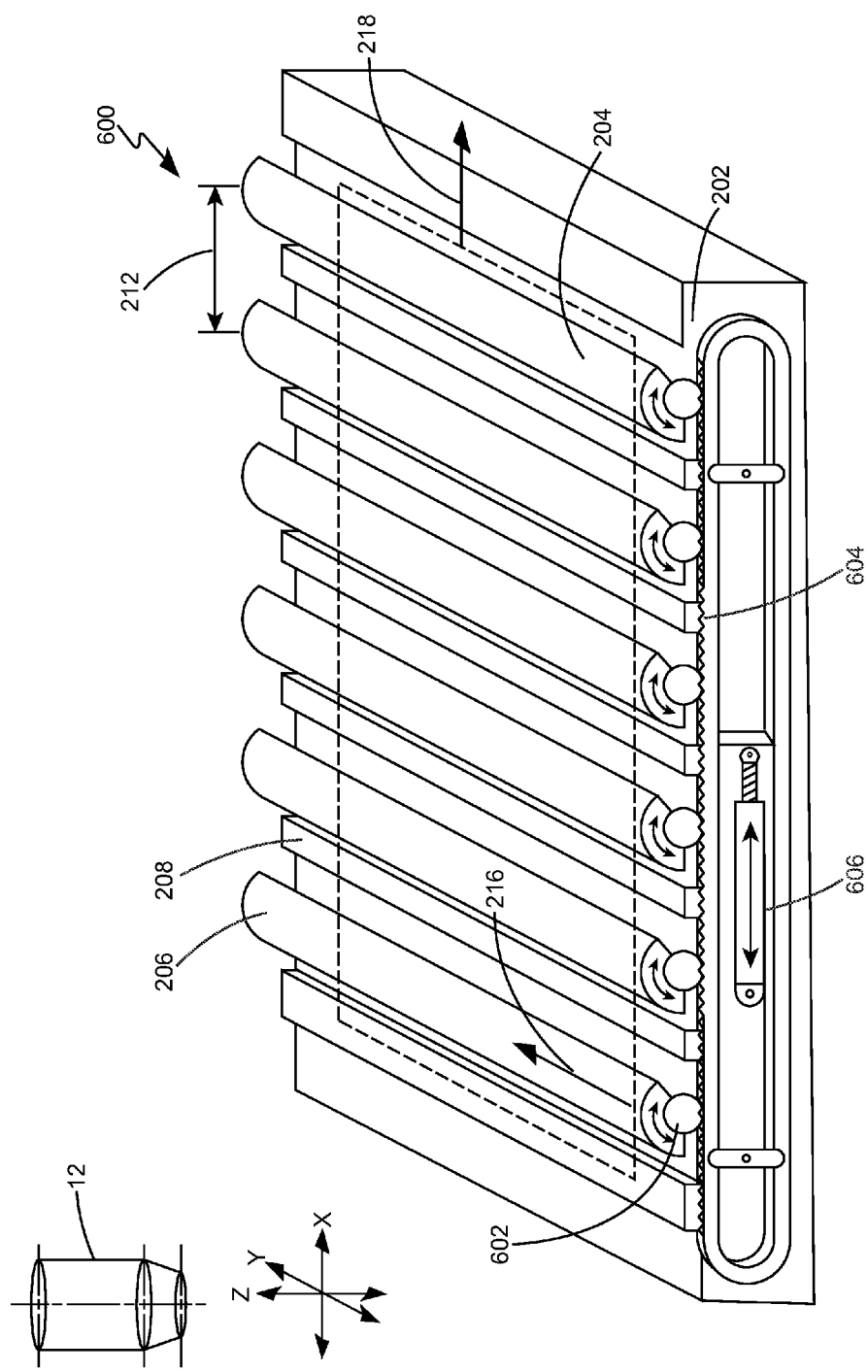
FIG. 6 illustrates an example of a rotating-rod build platform with raised features.

Referring now to FIG. 6, a rotating-rod build platform 600 for supporting a part 16 as it is being fabricated in layers by an extrusion-type additive manufacturing machine 10 is shown. In this example, a platform body 202 includes a number of raised features 204 that extend outward from the body 202 along the Z-axis as described above. The raised features 204 are rotatable rods having a greater than ninety degree, pie-shaped, cross section in a direction that is perpendicular to the nozzle's central axis or Z-Axis. While a straight-line, pie-shaped section is shown, the overhanging wall may be concave shaped as well. Each raised rod feature 204 is rotatable about a central, longitudinal axis, which may align with the X-Axis or Y-Axis. Gears 602 attached to each rod engage teeth on a unison rack 604, which is movable along the X-Axis (as shown) by an attached linear actuator 606.

Figure 7:
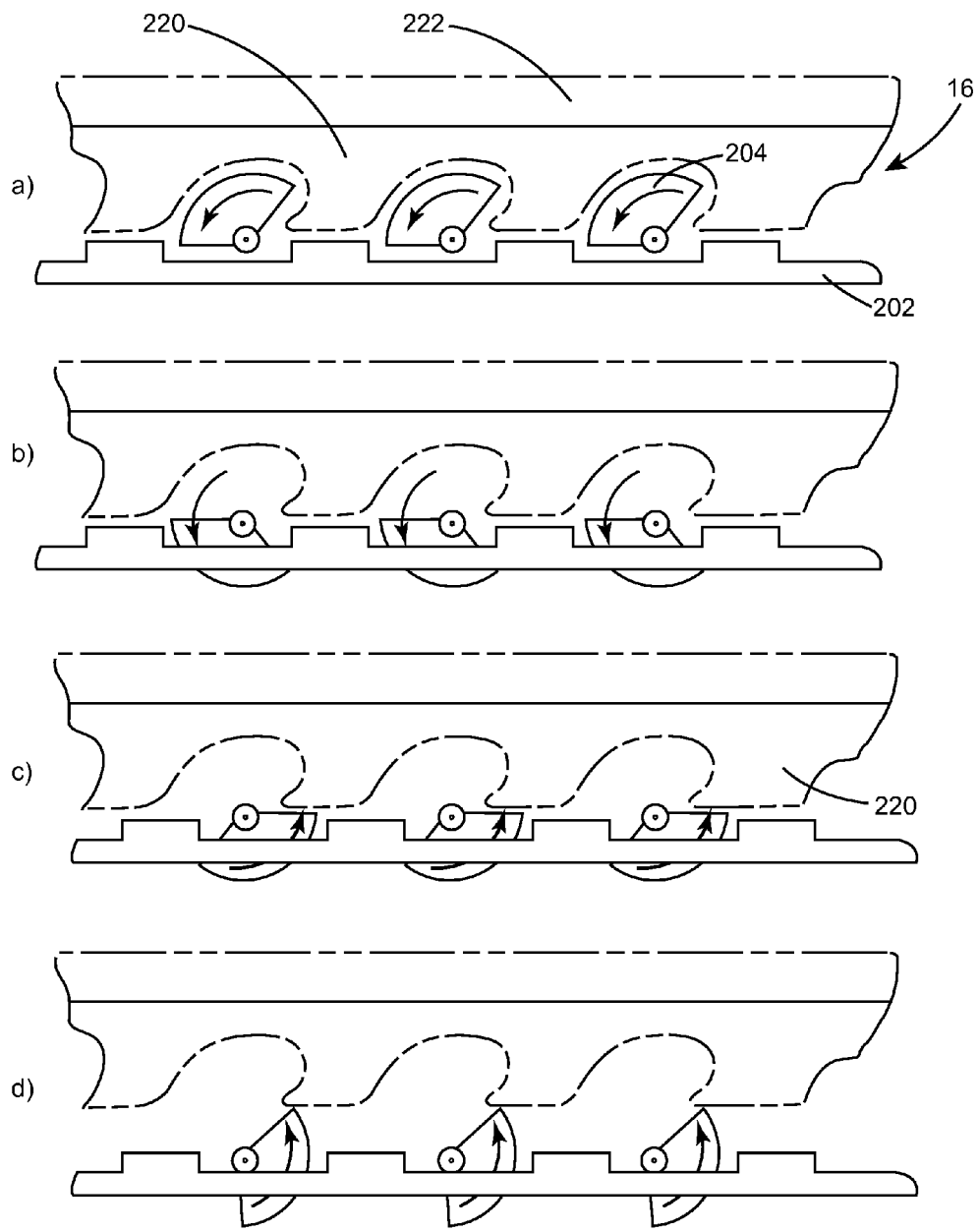
FIG. 7 illustrates a time-lapse a)-d) illustration of a rotating-rod build platform as it disengages a part after building and initial layers of the part shown in phantom lines.

Referring now to FIG. 7, a time-lapse illustration of the rotating-rod build platform 700 in operation is shown with certain features removed for clarity. In the first position labeled a), the rotating-rod features 204 are fully extended from the platform body 202 and are locked in place by the linear actuator 606. Protrusive areas 206 overhang recessive areas 208 when viewed from the nozzle's central axis. During the part 16 build, the initial layers 220 of material flow between the features 204 and at least partially fill the recessive areas 208 and flow beneath the overhang of the protrusive areas 206. The initial layers 220 and the features 204 cooperate as the material cools such that the part 16 is mechanically engaged with the build platform 600. After the part 16 is built and in the second position labeled b), the linear actuator 606 extends, moving the rack 604 to the right (FIG. 6). In turn, the rod features 204 rotate in unison, counter clockwise, to disengage the mechanical engagements between the features 204 and the part 16. In the third position labeled c), the linear actuator 606 extends further, moving the rack 604 further to the right. In turn, the rod features 204 rotate and contact the initial layers 220 of the part 16. In the fourth and final position labeled d), the linear actuator 606 extends even further, moving the rack 604 even further to the right. In turn, the rod features 204 rotate around and automatically discharge the part 16 from the build platform 600. The features 204 are reset into the position labeled a) to begin the next part 16 build.

Figure 8:
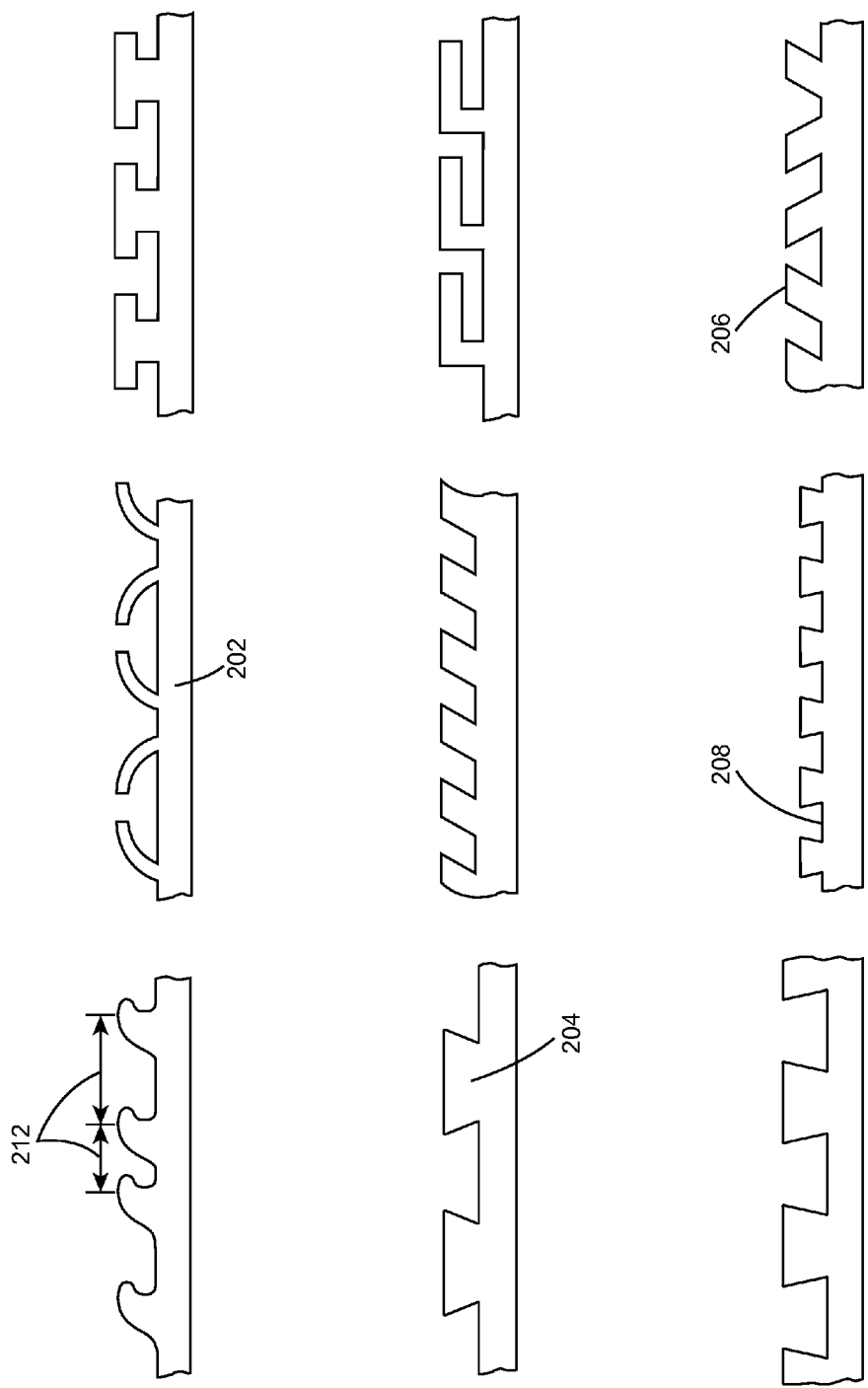
FIG. 8 illustrates non-exhaustive examples of raised features that define protrusive areas and recessive areas.

FIG. 8 illustrates non-exhaustive examples of raised features 204 that define protrusive areas 206 and recessive areas 208. As can be seen in the examples, various height 210, spacing 212 or pitch dimensions will effectively engage a part 16 as it is being built. As long as the initial layers 220 of a part 16 can flow between the protrusive areas 206, under the overhang, and into the recessive areas 208 the platform examples will properly engage the part 16.

The initial 1, 2, 3 or more layers 220 that engage the raised features 204 are extruded by the nozzle 12 at a first traverse speed and the additional layers 222 are extruded at a second traverse speed. In some examples, the first traverse speed is slower than the second traverse speed. In other examples, the first and second traverse speeds are identical. In yet other examples, the first traverse speed is faster than the second traverse speed.

The build platform examples are made from metallic or nonmetallic materials having glass transition temperatures below approximately 200 degrees Celsius (392 Fahrenheit), between approximately 200 degrees Celsius (392 Fahrenheit) and approximately 400 degrees Celsius (752 Fahrenheit) or greater than approximately 400 degrees Celsius (752 Fahrenheit). A thin body 202 allows the platforms to flex slightly in order to release a completed part 16. Metals such as aluminum alloy or stainless steel alloy for example may include raised features 204 that are manufactured by machining, stamping, upset rolling, casting or other methods. Thermoplastics such as acrylonitrile butadiene styrene (ABS) polymer, polycarbonates, polycaprolactone, polyphenylsulfones and amorphous polymers such as ABS and ULTEM or semi-crystalline polymers, such as PLA or Nylon may also be used to form the platforms. Polymers reinforced with discontinuous fibers such as carbon fibers may be used to add additional strength. The nonmetallic platforms may be formed by extrusion, injection molding, vacuum molding, additive manufacturing or other known forming methods.

Figure 9:
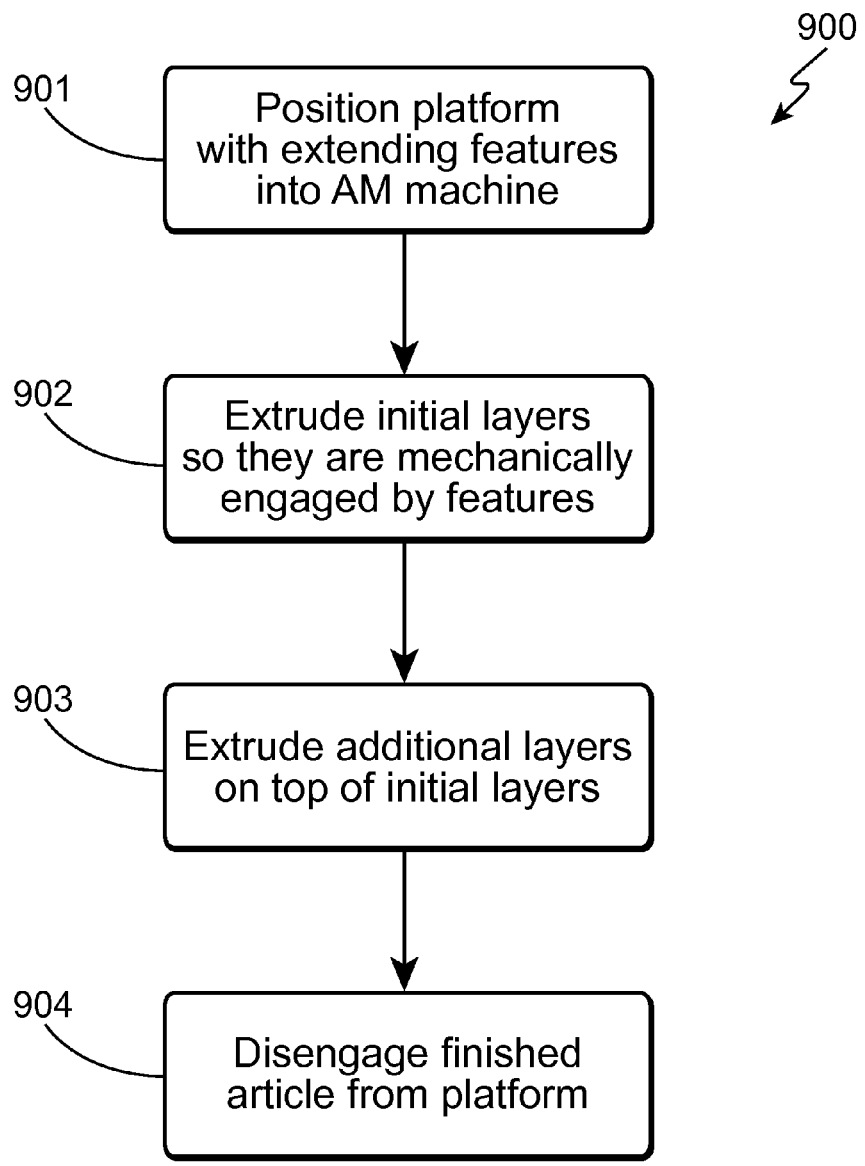
FIG. 9 illustrates a series of method steps for fabricating an article.

A method 900 for fabricating an article of manufacture from layers of a material extruded by an additive manufacturing machine nozzle is schematically illustrated in FIG. 9. In the first method step represented by block 901, a platform body having features extending outward and defining protrusive areas and recessive areas is positioned in a build area that is accessible by the nozzle. In a second step represented by block 902, one or more initial layers of material is extruded with the nozzle across the protrusive areas and recessive areas at a first traverse speed such that at least one of the initial layers at least partially fills the recessive areas and is mechanically engaged by the extending features. In a third step represented by block 903, additional layers of material are extruded with the nozzle on top of the initial layers at a second traverse speed such that the additional layers are thermally bonded to the initial layers and the article of manufacture is engaged with the platform body. In a final step represented by block 904, the article of manufacture is disengaged from the platform.

In some method examples, the first traverse speed 902 is less than the second traverse speed 903 in the extruding steps. In other examples, the first traverse speed 902 is equal to the second traverse speed 903 in the extruding steps. In yet other examples, the first traverse speed 902 is greater than the second traverse speed 903 in the extruding steps.

In some method examples, the disengaging step 904 includes sliding the article or part from the platform. In other examples, the disengaging step 904 includes flexing the features apart. In other examples, the disengaging step 904 includes flexing the features apart by rotating the platform body around a cylindrical roller. In yet other examples, the disengaging step includes rotating the features 360 degrees about their longitudinal axes.

In some examples, the initial layers are removed from the article of manufacture once it is disengaged from the platform. Processes such as sanding, machining, may be used to remove the initial layers of the part. As discussed earlier, the initial layers may be sacrificial and added to the CAD solid model before the build.

While this disclosure describes and enables several examples of an apparatus for supporting an article of manufacture fabricated from layers of material extruded by an additive manufacturing machine nozzle, other examples and applications are contemplated. Accordingly, the invention is intended to embrace those alternatives, modifications, equivalents, and variations as fall within the broad scope of the appended claims. The technology disclosed and claimed herein may be available for licensing in specific fields of use by the assignee of record.

What is claimed is:

1. An apparatus for supporting an article of manufacture that is being fabricated from layers of material extruded by an additive manufacturing machine nozzle, the apparatus comprising:
   a platform body having raised features extending outward from said body, said features defining protrusive areas and recessive areas of said body; and
   wherein the protrusive areas overhang the recessive areas when viewed from a nozzle central axis direction and cooperate to mechanically engage the extruded material that forms the initial layers of an article when the article is being fabricated.

2. The apparatus of claim 1 wherein said body includes a build area that is accessible by the nozzle when said platform body is installed in an additive manufacturing machine and a non-build area that is not accessible by the nozzle when said platform body is installed in an additive manufacturing machine.

3. The apparatus of claim 2 wherein a portion of the non-build area extends at least ninety degrees around at least one cylindrical roller.

4. The apparatus of claim 3 wherein a portion of the non-build area extends around and between at least two cylindrical rollers in a continuous, belt-like configuration.

5. The apparatus of claim 3 wherein the platform body is moveable such that the distance between protrusive areas increases when the build area is extending around a cylindrical roller in order to disengage a fabricated article from said platform body.

6. The apparatus of claim 1 wherein said platform body includes links that join said extending features in a linked-track configuration.

7. The apparatus of claim 1 wherein said raised features are rotatable rods having a greater than ninety degree pie-shaped cross section in a direction that is perpendicular to a nozzle central axis.

8. The apparatus of claim 1 wherein said platform body is made from a material that has a glass transition temperature of less than approximately 200 degrees Celsius.

9. The apparatus of claim 8 wherein said platform body is made from a material selected from the group consisting of aluminum alloys, stainless steel alloys and plastics.

\* \* \* \* \*